(12) United States Patent
Okamoto

(10) Patent No.: US 8,773,575 B2
(45) Date of Patent: Jul. 8, 2014

(54) DIGITAL CAMERA

(71) Applicant: Pentax Ricoh Imaging Company, Ltd., Tokyo (JP)

(72) Inventor: Teppei Okamoto, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 22 days.

(21) Appl. No.: 13/742,672

(22) Filed: Jan. 16, 2013

(65) Prior Publication Data

US 2013/0194475 A1   Aug. 1, 2013

(30) Foreign Application Priority Data

Jan. 30, 2012   (JP) .................................. 2012-016876

(51) Int. Cl.
*H04N 5/222* (2006.01)
*H04N 5/232* (2006.01)

(52) U.S. Cl.
USPC ..................................... 348/356; 348/333.02

(58) Field of Classification Search
USPC .................... 348/333.02, 346, 356
See application file for complete search history.

(56) References Cited

U.S. PATENT DOCUMENTS

| | | | |
|---|---|---|---|
| 6,827,190 B2 | 12/2004 | Hamasaki | |
| 6,879,445 B2 | 4/2005 | Hamasaki | |
| 7,099,576 B2 | 8/2006 | Hamasaki et al. | |
| 7,102,837 B2 | 9/2006 | Hamasaki et al. | |
| 7,213,693 B2 | 5/2007 | Iikawa et al. | |
| 7,454,135 B2 | 11/2008 | Nakata et al. | |
| 7,864,462 B2 | 1/2011 | Hamasaki | |
| 8,405,759 B2 * | 3/2013 | Kunishige et al. | 348/345 |
| 2007/0052836 A1 | 3/2007 | Yamada et al. | |
| 2008/0074531 A1 * | 3/2008 | Ide et al. | 348/346 |
| 2009/0237523 A1 | 9/2009 | Date et al. | |
| 2013/0083232 A1 * | 4/2013 | Tay | 348/357 |

FOREIGN PATENT DOCUMENTS

| | | |
|---|---|---|
| JP | 2003-250068 | 9/2003 |
| JP | 2004-069054 | 3/2004 |
| JP | 2004-145037 | 5/2004 |
| JP | 2004-145038 | 5/2004 |
| JP | 2005-114877 | 4/2005 |
| JP | 2005-127457 | 5/2005 |
| JP | 2005-128325 | 5/2005 |
| JP | 2005-188742 | 7/2005 |
| JP | 2005-208633 | 8/2005 |
| JP | 2006-145783 | 6/2006 |
| JP | 2007-060328 | 3/2007 |
| JP | 2009-231918 | 10/2009 |
| JP | 2011-175302 | 9/2011 |

\* cited by examiner

*Primary Examiner* — James Hannett
(74) *Attorney, Agent, or Firm* — Greenblum & Bernstein P.L.C.

(57) ABSTRACT

A digital camera includes an image sensor, a display device which displays a live-view display of an object image, an autofocus adjuster which detects a focal state and brings a specified object image into an in-focus state by moving a focal-adjusting lens group of a photographing lens, a focus lock-on device which prohibits the focal-adjusting lens group from moving and enters a focus locked-on state when the autofocus adjuster brings the specified object image into an in-focus state, a focus lock-on detector, and a distinguishing-display controller. When the focus lock-on detector detects a focus locked-on state, the distinguishing-display controller performs image processing on part or the entirety of the specified object image, and a peaking display of the specified object image is displayed on the display device.

4 Claims, 5 Drawing Sheets

DIGITAL CAMERA

BACKGROUND OF THE INVENTION

1. Field of the Invention

The present invention relates to a digital camera in which a distinguishing display (peaking display) is possible such that a specified in-focus object image can be distinguished (identified) from other object images and displayed.

2. Description of Related Art

In a digital camera of the related art, in order to improve the visibility and the distinguishability of the object image that is the subject of a focusing operation out of object images displayed on a monitor of the digital camera, a peaking display technique is known in which the outline (perimeter) of a specified in-focus object image and the peripheral portion thereof is distinguishably (identifiably) indicated by, e.g., a different color to that of the other object images, or an image area that includes a specified in-focus object image is distinguishably indicated by, e.g., a different color or brightness to that of the other object images (Japanese Unexamined Patent Publication Nos. 2003-250068, 2007-60328 and 2009-231918).

However, since the peaking display according to the related art is a display of a deformed image of the actual photographed image in order to facilitate the focus adjustment, such a peaking display is unsuitable for confirming the photographic composition and color, etc. Accordingly, when a peaking display is carried out when the user is observing the object image by viewing the monitor, confirmation of the photographic composition and color cannot be favorably carried out.

SUMMARY OF THE INVENTION

The present invention has been devised in view of the above-described problems, and provides a digital camera in which a peaking display is possible at a timing that is appropriate for confirming and making fine adjustments to the focal state in an autofocus adjusting process.

The present invention has been accomplished by taking into account that, in an autofocus mode (AF mode), a peaking display that is appropriate for confirming and carrying out a fine adjustment of the focal state is possible if the peaking display on the monitor is started as soon as the autofocus adjusting process enters a focus locked-on state.

According to an aspect of the present invention, a digital camera is provided, including an image sensor which captures an object image via a photographing lens; a display device which displays an object image captured by said image sensor; an autofocus adjuster which detects a focal state based on the object image captured by the image sensor and brings a specified object image into an in-focus state, based on the detected focal state, by moving a focal-adjusting lens group of the photographing lens in the optical axis direction thereof; a focus lock-on device which prohibits the focal-adjusting lens group from moving in the optical axis direction, via the autofocus adjuster, and enters a focus locked-on state when the autofocus adjuster brings the specified object image into an in-focus state; a focus lock-on detector which detects whether or not the focus lock-on device is in a focus locked-on state; and a distinguishing-display controller which carries out image processing on at least a part of the specified object image, whereby a peaking display of the specified object image is displayed on the display device in a distinguished manner from the other object images. The image processing and the peaking display of the specified object image are carried out by the distinguishing-display controller when the focus lock-on detector detects a focus locked-on state of the focus lock-on device.

It is desirable for the digital camera to include a lens detector which detects whether or not the photographing lens is a specific-function photographing lens that is provided with a manual operational member which moves the focal-adjusting lens group via a manual operation independent from the autofocus adjuster. In the case where the focus lock-on detector detects that the focus lock-on device is in a focus locked-on state and the lens detector detects that the photographing lens is the specific-function photographing lens, the distinguishing-display controller carries out image processing on at least a part of the specified object image, whereby the specified object image is displayed on the display device in a distinguished manner from the other object images.

It is desirable for the digital camera to include a magnified-display controller which displays, in the display device, a magnified view of a section including at least the specified object image of the object image captured by the image sensor. When a magnified view is displayed by the magnified-display controller, the magnified-display controller carries out image processing on at least a part of the specified object image, whereby a magnified peaking display of the specified object image is displayed on the display device in a distinguished manner from the other object images.

It is desirable for the distinguishing-display controller to display, in the display device, a perimeter of the specified object image with a different thickness, color or brightness to a perimeter of the other object images.

According to the present invention, since a peaking display that distinguishes a specified object image from other object images indicated on a display is not carried out during a time when a focus-adjustment lens group can move (along the optical axis direction) via an autofocus adjustment device, it is easy to confirm the photographic composition and the color. Furthermore, when in a focus locked-on state, in which movement of the focus-adjustment lens group via the autofocus adjustment device is prohibited, occurs upon the specified object image being brought into focus by the autofocus adjustment device, since a peaking display is carried out which distinguishes the specified object image on the display from the other object images by performing a partial or entire imaging process, the peaking display can start at a timing that is suitable for confirming and carrying out a fine adjustment of the focus state.

The present disclosure relates to subject matter contained in Japanese Patent Application No. 2012-016876 (filed on Jan. 30, 2012) which is expressly incorporated herein in its entirety.

BRIEF DESCRIPTION OF THE DRAWINGS

The present invention will be discussed below in detail with reference to the accompanying drawings, in which:

FIGS. 2A and 2B show an embodiment of an embodiment of a peaking display of a monitor provided on the exchangeable lens digital camera, wherein FIG. 2A shows a state in which no peaking display is indicated, and FIG. 2B shows a state in which a peaking display is indicated;

DESCRIPTION OF THE EMBODIMENTS

Figure 1:
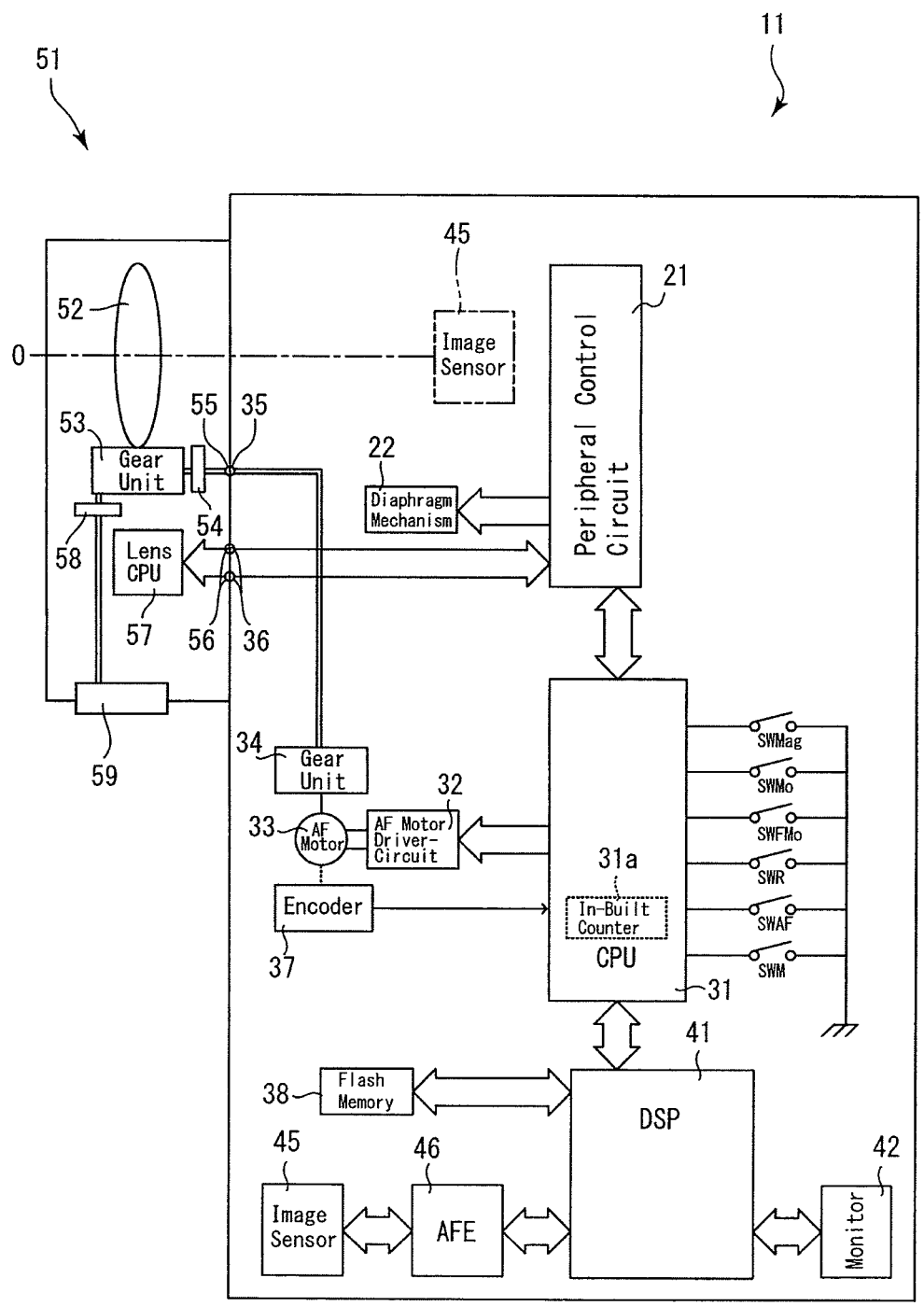
FIG. 1 is a block diagram showing main components of an embodiment of a mirrorless exchangeable lens digital camera, to which the present invention is applied.

FIG. 1 is a block diagram showing main components of an embodiment of a mirrorless exchangeable lens digital camera, to which the present invention is applied. The exchangeable lens digital camera is provided with a camera body 11 and a photographing lens 51 which his detachably attached to the camera body 11.

The camera body 11 is provided with a body CPU (focus lock-on device, autofocus adjuster/focus lock-on detector/distinguishing-display controller/magnified-display controller/lens detector) 31 as a controller for controlling the overall functions of the camera body 11 and the photographing lens 51.

Whereas, the photographing lens 51 is provided with a lens CPU 57 which controls various lens functions, a gear unit 53 for driving (moving) a focal-adjusting lens group 52 in the optical axis direction (a direction parallel to an optical axis O), and an interconnecting joint 55 (which is detachably attachable to a joint 35 that is provided on the camera body 11) provided on a mount of the photographing lens 51. The gear unit 53 includes a distance-adjustment ring which moves the focal-adjusting lens group 52 in the optical axis direction while rotating about the optical axis O, and the gear unit 53 and the joint 55 are interconnected via a one-way input/output rotational transfer mechanism 54. Furthermore, the photographing lens 51 is provided with a manual operational ring (manual operational member) 59 which is manually operated by the user. The manual operational ring 59 and the gear unit 53 are interconnected with each other via a one-way input/output rotational transfer mechanism (manual operational member) 58.

In the photographing lens 51, the one-way input/output rotational transfer mechanism 54 is a known mechanism which transfers the rotation of the joint 55 to the gear unit 53 but does not transfer the rotation of the gear unit 53 to the joint 55, and the one-way input/output rotational transfer mechanism 58 is also a known mechanism which transfers the rotation of the manual operational ring 59 to the gear unit 53 but does not transfer the rotation of the gear unit 53 to the manual operational ring 59. These types of mechanisms are known to be used as a seamless lens-drive switching mechanism (for example, Japanese Unexamined Patent Publication Nos. 2004-69054, 2004-145037, 2004-145038, 2005-188742, 2005-208633, 2005-127457, 2005-114877, 2005-128325, 2006-145783 and 2011-175302). In the illustrated embodiment, a photographing lens that is provided with a seamless lens-drive switching mechanism is referred to as a "specific-function photographing lens (quick shift lens)".

A specific-function photographing lens (quick shift lens) is a photographing lens provided with a mechanism in which a lens-drive ring is rotatably driven to move a focal adjustment lens group in the optical axis direction by a driving device provided in the camera body for carrying out an autofocus adjustment while the lens-drive ring can be manually rotated to move a focal adjustment lens group in the optical axis direction by a rotation of a manual operational ring of the photographing lens, and is a photographing lens which can also be detachably attached to related-art digital cameras. In other words, it is possible for the focal adjustment lens group of the specific-function photographing lens (quick shift lens) to be manually moved independently (via, e.g., a clutch mechanism) from an autofocus adjuster that is provided in the digital camera, to which the photographing lens is mounted, without risking damage to the autofocus adjuster. For example, after the focal adjustment lens group is moved to an in-focus position with respect to a specified object image via the autofocus adjuster that is provided in the digital camera, it is possible to carry out an additional manual focal adjustment (in which the focal adjustment lens group is moved) from this state without manually switching from an AF (autofocus) mode to an MF (manual focus) mode.

The body CPU 31 rotatably drives an AF motor 33 via an AF motor driver-circuit 32. The rotation of the AF motor 33 is reduced (in speed) by a gear unit 34, is transmitted to the gear unit 53 via the connection between the joint 35 provided on the mount of the camera body 11 and the joint 55 provided on the mount of the photographing lens 51, and via the one-way input/output rotational transfer mechanism 54, to thereby linearly move the focal-adjusting lens group 52 in the optical axis direction via the gear unit 53. The AF motor 33 is provided with an encoder 37 which outputs an AF pulse in accordance with the rotation of the AF motor 33. The body CPU 31, having a known configuration, counts the number of AF pulses output by the encoder 37 using an in-built counter 31a in accordance with the rotational direction of the AF motor 33, to thereby detect the position of the focal-adjusting lens group 52 with respect to the optical axis direction. The body CPU 31, the AF motor driver-circuit 32, the AF motor 33, the gear unit 34, the joint 35, an image sensor 45, an AFE 46, and a DSP 41 constitute the autofocus adjuster of the camera body 11.

The lens CPU 57 is connected to a peripheral control circuit 21 in the camera body 11 via an electrical contact group 56 (provided on the mount of the photographing lens 51) and an electrical contact group 36 (provided on the mount of the camera body 11), which are connected to each other. Predetermined data communication, such as lens-type information, open (minimum) f-number/maximum f-number information, focal length information, and photographic distance information, etc., is transmitted between the lens CPU 57 and the body CPU 31 via the peripheral control circuit 21. The lens-type information includes information to identify a specific-function photographing lens (quick-shift lens) that is provided with a manual operational member which moves the focal-adjusting lens group 52 via a manual operation that is independent from the autofocus adjuster of the camera body 11. In other words, since the body CPU 31 communicates with the lens CPU 57 via the peripheral control circuit 21, the body CPU (lens detector) 31 can detect whether or not the photographing lens 51 that is mounted onto the camera body 11 is a specific-function photographing lens (quick-shift lens).

The camera body 11 is further provided with a diaphragm mechanism 22 which controls a diaphragm device (not shown), by varying (opening/closing) the aperture size thereof, that is provided in the photographing lens 51.

A focus mode switch SWFMo for switching the focusing mode between a manual focusing mode (MF) and an autofocus (single AF/continuous AF) mode, an AF operation switch SWAF for starting an autofocus operation, a release switch SWR for starting a still-image imaging process or a still-image recording process, a main switch SWM for turning ON/OFF the power source to the peripheral control circuit 21, etc., a mode switch SWMo for switching between modes such as photographing mode/play-back mode/setting mode, etc., and for turning ON/OFF a peaking display, and magnification display switch SWMag for displaying a magnified (enlarged) section that includes an in-focus object image, are each connected to the body CPU 31. In a single AF mode, when an object image is brought into focus in the AF process (autofocus process), an AF lock-on process which prohibits the focal-adjusting lens group 52 from moving (in the optical axis direction) is carried out.

The image sensor 45 is provided in the camera body 11 to serve as a photographing unit. An object-image light bundle (object emanating light) that enters into the camera body 11 from the photographing lens 51 is incident on a light-receiving surface of the image sensor 45 to form an object image thereon. The image sensor 45 electronically converts the sensed (received) object image into an image signal and outputs this image signal. The image (object image) signal that is output from the image sensor 45 is digitalized by the AFE (analog front end) 46, a white-balance signal process, etc., is carried out by the DSP 41, and a conversion process is carried out to convert the signal into displayable display-image signal by a monitor (display device) 42, and the object image is displayed in the monitor 42 by the display-image signal. The monitor 42 is installed on the back surface of the camera body 11. Furthermore, the monitor 42 displays various photographic information such as the set AF mode (single AF/continuous AF), the photographing mode/play-back mode/setting mode, the shutter speed, and the aperture value, etc. Note that in FIG. 1, the image sensor 45, onto which the object-image light bundle is incident, which is indicated by a two-dot chain line and the image sensor 45, connected to the AFE 46, which is indicated by a solid line designate the same image sensor.

The DSP 41 transmits, between itself and the body CPU 31, image signals and photographic information, and operates in accordance with the operational state of the body CPU 31. For example, in the case where the body CPU 31 is operating in the photographing mode, the DSP 41 and the monitor 42 operates as a live-view (live-preview) display (through mode display) that displays an image to the monitor 42, according to the image signal output by the image sensor 45 via the AFE 46 and the DSP 41. In the case where the body CPU 31 performs an autofocus adjustment operation (AF process), the DSP 41 converts the image signal output from the image sensor 45 into an image signal that can be processed by the body CPU 31, and outputs this converted signal to the body CPU 31. In the case where the body CPU 31 performs a still-image imaging process, the DSP 41 operates the image sensor 45 to perform an imaging process under the conditions set by the body CPU 31 and performs a predetermined process on the object-image signal captured by the image sensor 45, and stores this object-image signal in a flash memory 38. The DSP 41 also functions as part of a distinguishing-display controller and a magnified-display controller in accordance with the set mode. The flash memory 38 is a known memory card which is detachably attached to (inserted into) the camera body 11.

Upon the main switch SWM being operated to turn ON the power source, the body CPU 31 turns ON the power for the other components inside the camera body 11 such as the peripheral control circuit 21 and the DSP 41, etc., and initialization information is displayed on the monitor 42. The peripheral control circuit 21 communicates with the lens CPU 57 and transmits lens-type information, etc., to the body CPU 31. In the case where the photographing mode has been selected, the body CPU 31 commands the image sensor 45 to start image-processing for a live-view display via the DSP 41, and a live-view display of the object image captured by the image sensor 45 is indicated on the monitor 42 via the DSP 41. The imaging process performed by the image sensor 45 for the live-view display is the same imaging process as, for example, that of a movie imaging process in which the images are processed repeatedly over a predetermined period of time interval.

The body CPU 31 detects the brightness of the object from the object-image signal that is output from the DSP 41, and adjusts, via the DSP 41, the exposure time (electronic shutter speed) of the image sensor 45 or the gain of the object-image signal output from the image sensor 45.

The camera body 11 (body CPU 31) is provided with a known autofocus adjusting function. In the illustrated embodiment, the body CPU 31 performs an "image contrast method", which is known in the art. Upon the AF operation switch SWAF being turned ON, the body CPU 31 commences an autofocus adjusting process. The body CPU 31 calculates a contrast value based on the object image that is captured by the image sensor 45 while moving the focal-adjusting lens group 52 between a minimum-distance in-focus position and an infinite-distance in-focus position via the AF motor 33, performs a contrast search process which detects the position (in-focus position) of the focal-adjusting lens group 52 at which the contrast peaks, and upon detecting the position (in-focus position) at which the contrast peaks, the focal-adjusting lens group 52 is moved to this detected position (in-focus position). When the focal-adjusting lens group 52 has moved to the in-focus position, in the case where the single AF mode has been selected, the body CPU 31 prohibits further driving (rotation) of the AF motor 33, and holds (AF lock-on) the focal-adjusting lens group 52 at this in-focus position.

In the case where the manual focus mode is selected, the body CPU 31 detects a contrast peak based on the object-image signal captured by the image sensor 45 without driving (rotating) the AF motor 33.

Figure 2A:
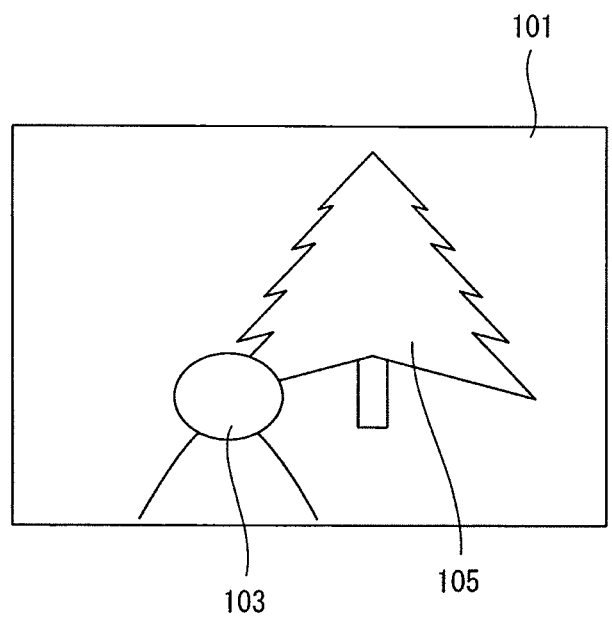
Figure 2B:
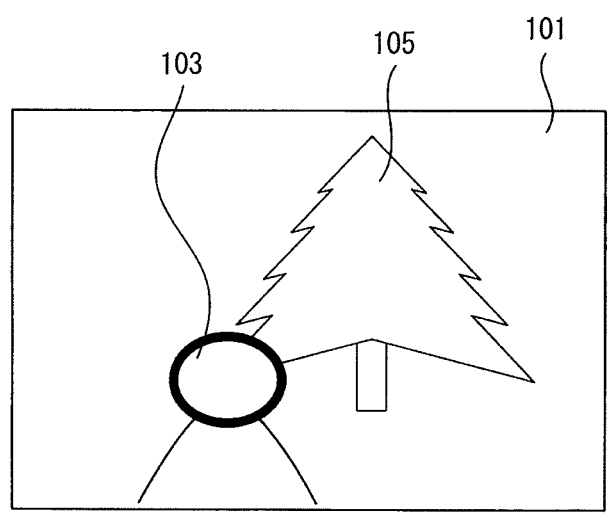

Furthermore, when the focal-adjusting lens group 52 is moved to the in-focus position and enters an AF locked-on state, in the autofocus adjusting process, the camera body 11 performs image processing on the specified object-image that has been brought into focus and indicates this in-focus object image (hereinafter referred to as "peaking display") on a screen 101 of the monitor 42 while distinguishing this in-focus object image from the other object images. FIGS. 2A and 2B each show a photographic image including the foreground (a person) and the background (a tree in the background), showing the screen 101 of the monitor 42 when focusing on the face of the person. FIG. 2A shows a normal display (non-peak display) on the screen 101. Since the normal display on the screen 101 displays an image of a person 103 and a tree image 105 in the background in a normal manner (non-peak display), it is difficult to visually confirm (distinguish) whether the image of a person 103 or the tree image 105 has been brought into focus, and especially which part of the image of a person 103 has been brought into focus (in the case where the image of a person 103 has been brought into focus). FIG. 2B shows the screen 101 having a peaking display in which the object image that has been brought into focus is indicated with a peaking display. In the screen 101 having a peaking display, the perimeter (profile) of the image of a person 103 (facial image) that has been brought into focus is shown as a peaking display. In the peaking display of the illustrated embodiment, the perimeter of the facial image (the contrast peak or a detected section within a predetermined range) of the image of a person 103 that has been brought into focus is shown in bold and is darkened (blackened), and, e.g., the person's body other than the person's face of the image of a person 103 is not clearly indicated (distinguished). Accordingly, the user can easily visually-confirm (distinguish) that the face of the image of a person 103 has been brought into focus. As shown in FIG. 2B, the peaking display carries out a partial profile-highlighting process within the image section in which a contrast peak has been detected, however, the peaking display can be applied to an image area (or partial image area) in which a peak contrast has been detected in part of the face such as the eye(s), or shoulder(s), arm(s), or hand(s), etc., or a section thereof, or the peaking display can be applied to an entire in-focus object image by determining a peak contrast width or a series of profiles. Furthermore, the peaking display according to the present invention can be carried out, as described above, on each object image in the case where a plurality of objects have been brought into focus.

Note that in the illustrated embodiment, in the case where a focusing process is performed on a plurality of specified objects, e.g., a human face and other detected objects, the body CPU 31 selects the object at the closest distance as the specified object to be brought into focus.

FIG. 2B shows a peaking display in which the display (screen 101) of the monitor 42 shows the perimeter (profile) of the in-focus object image in bold and with a lowered brightness (darkened), however, a peaking display can alternatively show, for example, a changed color of the in-focus object image or a changed section of the object image, etc.

Furthermore, the body CPU 31 is provided with a magnification display function for displaying a magnified view of the in-focus object image or an image including the periphery thereof on the monitor 42, desirably with the display centered at the center of the in-focus object image. For example, upon the magnification display switch SWMag being switched ON, the body CPU 31 displays a magnified view of the in-focus object image including the periphery thereof on the monitor 42 via the DSP 41. At this time, a magnified peaking display can be indicated on the in-focus object image that is being displayed as a magnified view.

The digital camera of the present invention is characterized by the body CPU 31 commencing a peaking display on the monitor 42 from the instance at which the autofocus adjusting process in the autofocus mode (AF mode) has completed and is in a focus locked-on state. This characteristic feature of the present invention will be described hereinafter with reference to FIGS. 3 through 5.

Figure 3:
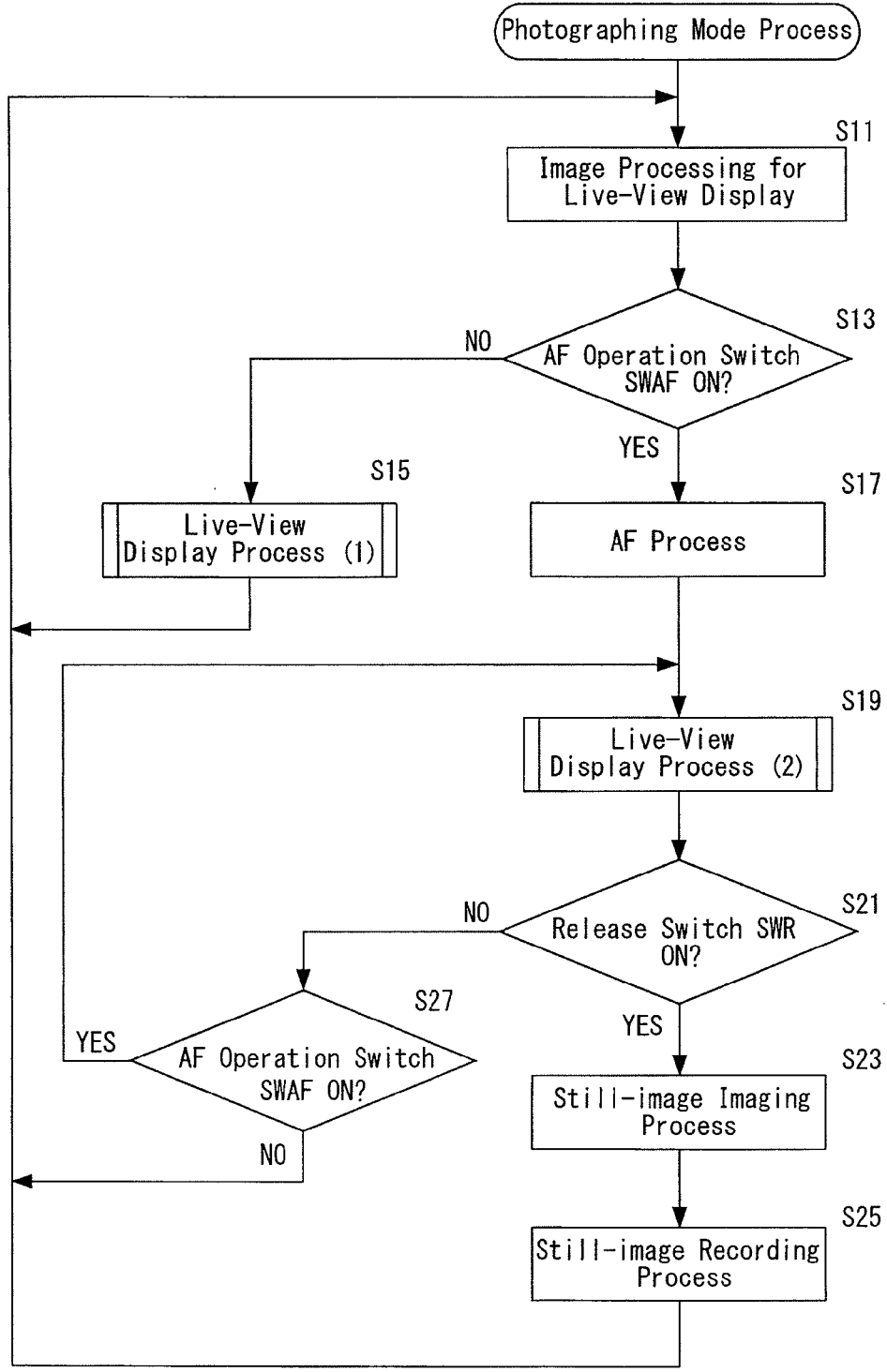
FIG. 3 shows a flowchart of operations that are performed in the photographing mode of the exchangeable lens digital camera.

The photographing mode process shown in FIG. 3 is controlled by the body CPU 31 upon the power source being turned ON by the main switch SWM and the photographing mode being selected by the mode switch SWMo.

Upon control entering the photographing mode process, the body CPU 31 first commands the image sensor 45 to commence image processing for the live-view display (step S11). Thereafter, the body CPU 31 checks whether or not the AF operation switch SWAF is ON (step S13). If the AF operation switch SWAF is not ON (step 13: NO), a live-view display process (1) is performed (step S15), and control returns to step S11. Note that when control commences the image processing for the live-view display, the DSP 41 commands the image sensor 45 to perform an imaging operation for use in the live-view display, and the live-view display process of the captured image is continuously displayed on the monitor 42.

Figure 4:
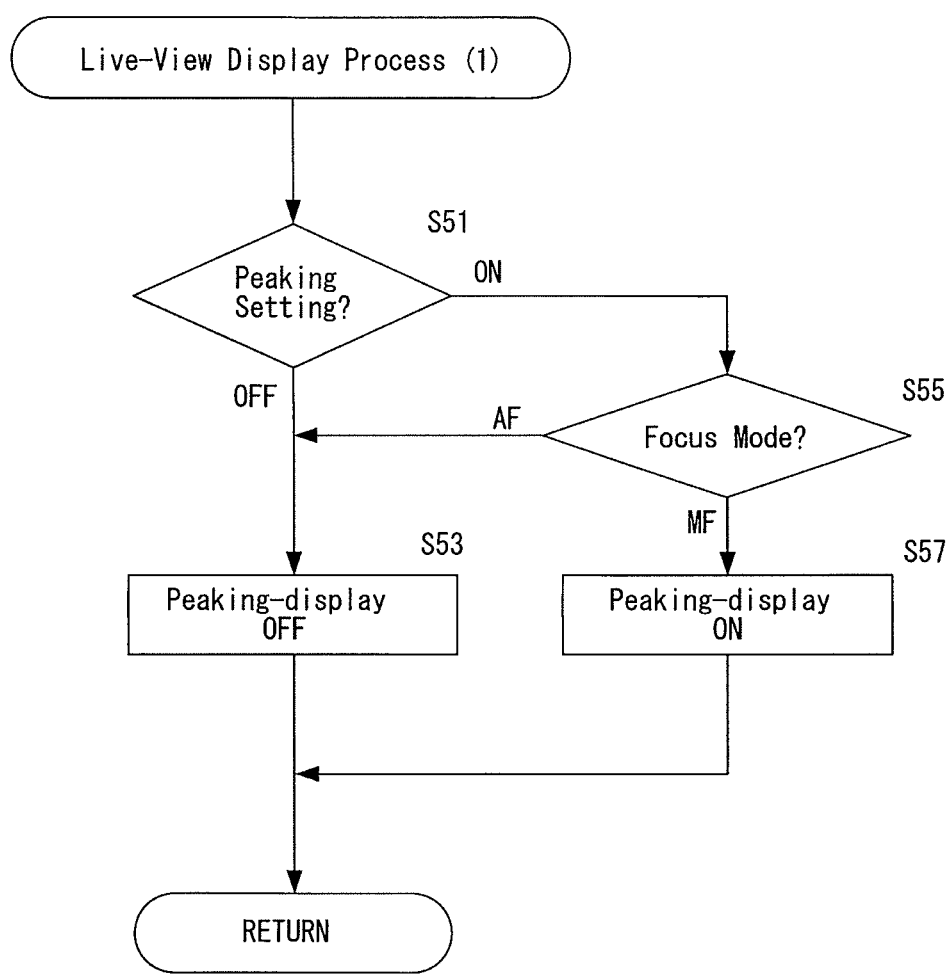
FIG. 4 shows a flowchart of operations that are performed in the live-view image display process (1) indicated in FIG. 3, according to the illustrated embodiment.

The live-view display process (1) will be described with reference to the flowchart shown in FIG. 4. Upon control entering the live-view display process (1), the body CPU 31 first checks whether the peaking setting is ON or OFF (whether or not there is a peaking display) (step S51). In the case where the peaking display is OFF (step S51: OFF), the body CPU 31 sets the peaking setting to peaking-display OFF, and control returns (step S53, RETURN). When the peaking setting is set to peaking-display OFF, even if the focal-adjusting lens group 52 is moved to the in-focus position to focus on a specified object, the in-focus object image displayed on the monitor 42 is indicated without any peaking display (FIG. 2A). The ON/OFF operation of the peaking setting (peaking-display ON and OFF) is not limited to the switching operation of the mode switch SWMo; the peaking setting can be carried by a camera-function internal memory setting operation.

If the peaking setting has been turned ON (step S51: ON), the body CPU 31 checks whether focusing mode that has been selected by the focus mode switch SWFMo has been set to the AF (autofocus) mode or the MF (manual focus) mode (step S55). If the focus mode has been set to the AF mode (step S55: AF), the peaking setting is set to peaking-display OFF, and control returns (step S53, RETURN). If the focus mode has been set to the MF mode (step S55: MF), the peaking setting is set to peaking-display ON, and control returns (step S57, RETURN). If the peaking setting is set to peaking-display ON, when the focal-adjusting lens group 52 is moved to the in-focus position to focus on a specified object via a manual focusing (MF) operation performed by a user (photographer) during a live-view display (live-view display) being carried out on the monitor 42, the in-focus object image displayed on the monitor 42 is indicated with a peaking display (FIG. 2B).

The body CPU 31 repeats the processes from step S11 through step S15 until the AF operation switch SWAF is switched ON. Due to these processes in step S11 through step S15, even if the peaking setting is ON while the AF operation switch SWAF is OFF, in the live-view display on the monitor 42, a peaking display is not shown in the AF mode and a peaking display is shown in the MF mode.

If the AF operation switch SWAF is switched ON (step S13: YES), the body CPU 31 commences the AF (autofocus adjusting) process (step S17). In the AF process, the body CPU 31 detects a contrast based on an object image captured (imaged) by the image sensor 45 for the live-view display while driving (moving) the focal-adjusting lens group 52 in a stepwise manner via the AF motor 33, for example, from the minimum-distance in-focus position to the infinite in-focus position (or from the infinite in-focus position to the minimum-distance in-focus position, the current position to either movement extremity, or within a movement range on either side of the current position), and upon a contrast peak being detected, the focal-adjusting lens group 52 is moved to the lens position at which the contrast peak was attained (in-focus position). Due to the AF process at step S17, the body CPU 31 drives (moves) the focal-adjusting lens group 52 by one step, detects the object-image contrast, moves the focal-adjusting lens group 52 to the lens position at which a contrast peak was attained, and control proceeds to step S19 to carry out the live-view display process (2).

Figure 5:
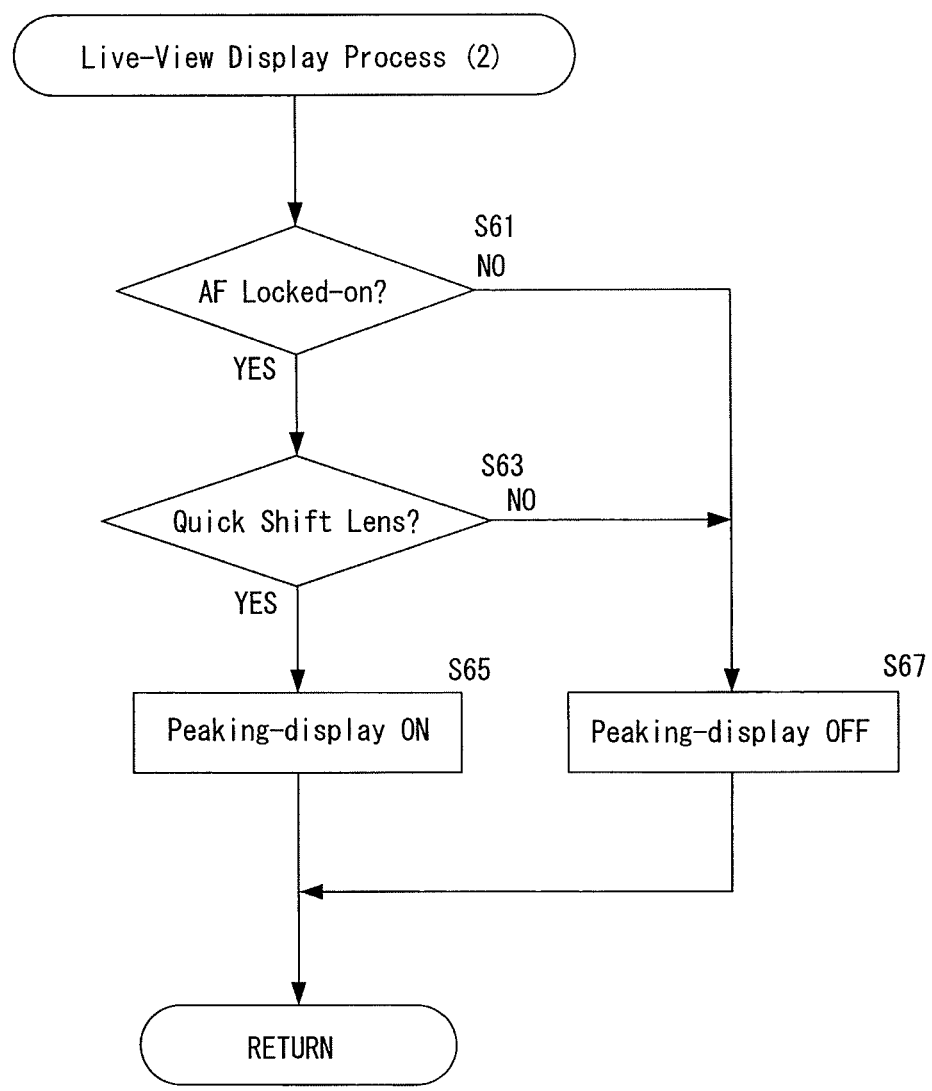
FIG. 5 shows a flowchart of operations that are performed in the live-view image display process (2) indicated in FIG. 3, according to the illustrated embodiment.

The live-view display process (2) of step S19 will be herein described with reference to the flowchart of FIG. 5. Upon control entering the live-view display process (2), the body CPU 31 first checks whether or not control has entered an AF locked-on (autofocus locked-on) state (step S61). The AF locked-on state refers to a state in the AF process of step S17 in which the AF motor 33 is prohibited from driving (rotating) upon a contrast peak being detected in a specified object image and the focal-adjusting lens group 52 being moved to an in-focus position, at which the contrast peak was attained. In the AF locked-on state, although the driving of the AF motor 33 is prohibited, a contrast and peak detection process, in which the contrast and contrast peaks are detected based on the object image that is captured by the image sensor 45 via the live-view display process, continues while the photographing mode is set.

In an AF locked-on state (step S61: YES), the body CPU 31 determines whether or not the photographing lens 51 that is attached to the camera body 11 is a specific-function photographing lens (quick shift lens) (step S63).

When the body CPU 31 determines that control has entered an AF locked-on state (step S61: YES) and that the photographing lens 51 that is attached to the camera body 11 is a specific-function photographing lens (quick shift lens) (step S63: YES), the peaking setting is set to peaking-display ON, and control returns (step S65: RETURN). Upon the peaking setting being set to peaking-display ON, the body CPU 31 detects the contrast peak of the specified object image, via the AF process in step S17, and upon the focal-adjusting lens group 52 moving to the lens position at which the contrast peak was attained to bring the specified object image into focus, a peaking display is carried out on the in-focus specified object image that is shown on the monitor 42 (see FIG. 2B). Accordingly, the user can thereafter manually rotate the manual operational ring 59 while viewing the peaking display on the monitor 42, without switching from the AF mode to the MF mode, to thereby carry out a focal adjustment.

When control is not in an AF lock-on state (step S61: NO), the body CPU 31 and/or when control determines that the photographing lens 51 that is attached to the camera body 11 is not a specific-function photographing lens (quick shift lens) (step S63: NO), the peaking setting is set to peaking-display OFF, and control returns (step S67: RETURN). Upon the peaking setting being set to peaking-display OFF, the body CPU 31 detects the contrast peak of the specified object image, via the AF process in step S17, and upon the focal-adjusting lens group 52 moving to the lens position at which the contrast peak was attained, no peaking display is indicated on the in-focus specified object image that is shown on the monitor 42; in other words, the in-focus specified object image is shown on the monitor 42 without any special process (image processing) being carried out thereon (see FIG. 2A).

Note that upon control returning from the through-the-lens process (2), the body CPU 31 checks whether or not the release switch SWR is ON (step S21). If the release switch SWR is OFF (step S21: NO), the body CPU 31 checks whether or not the AF operation switch SWAF is ON (step S27). If the AF operation switch SWAF is ON (step S27: YES), control returns to step S19 to repeat the through-the-lens process (2). If the AF operation switch SWAF is OFF (step S27: NO), control returns to step S11. While the through-the-lens process (2) is repeated (step S19; step S21: NO; step S27: YES; and step S19), the body CPU 31 carries out a peaking display on an object image that has been newly brought into focus due to an MF operation, due to a change in the composition, or when the object that is brought into focus changes due to the object itself moving.

If the release switch SWR is ON (step S21: YES), a known still-image imaging process (step S23) and still-image recording process (step S25), in which the captured still-image data is written in the flash memory 38, are carried out, and thereafter control returns to step S11.

As described above, according to the digital camera of the illustrated embodiment, the body CPU (focus lock-on device/autofocus adjuster/focus lock-on detector/distinguishing-display controller) 31 detects whether or not control is in an AF lock-on state, and if it is detected that control is in an AF lock-on state, image processing is carried out on either a part of or the entirety of a specified object image, and this specified object image is indicated on the monitor 42 in a manner so as to be distinguished from the other object images. Accordingly, while there is still a possibility of the focal-adjusting lens group 52 being moved (to carry out a focusing operation), since image processing is not carried out on either a part of or the entirety of a specified object image, nor is a peaking display of this specified object image indicated on the monitor 42 in a manner so as to be distinguished from the other object images, it is easy to confirm the photographic composition and the color. Furthermore, when the specified object image is brought into focus by the autofocus adjusting process and control enters a focus locked-on state in which movement of the focal-adjusting lens group 52 is prohibited, since image processing is carried out on either a part of or the entirety of a specified object image, and a peaking display of this specified object image is indicated on the monitor 42 in a manner so as to be distinguished from the other object images, the peaking display can be commenced at a timing that is appropriate for confirming and making fine adjustments to the focal state.

Furthermore, the digital camera of the illustrated embodiment is useful in the case where the photographing lens 51 that is attached to the camera body 11 is a specific-function photographing lens (quick shift lens). Accordingly, upon the AF focus process bringing the specified object image into focus and entering an AF locked-on state, the user (photographer) can manually rotate the manual operational ring 59 while viewing the peaking display of the specified object image on the screen 101 of the monitor 42 without switching from the AF mode to the MF mode, to thereby carry out a fine adjustment on the focal state.

Whereas in a digital camera of the related art, if a peaking display is carried out during an autofocus adjusting process, the display thereof is troublesome, and it is difficult to confirm and photographic composition and color, etc.; however, if a peaking display is not carried out, even upon the autofocus adjuster bringing an object into focus, it becomes difficult to distinguish on the screen of the monitor which object (object image) has been brought into focus, so that further focal adjustment is difficult. Furthermore, in the related art, since there is no notification given to the camera body that a manual focal adjustment has been carried out, the camera body cannot commence a peaking display upon detecting that the focusing mode has been switched to the manual focusing mode (operation).

In the illustrated embodiment of the present invention, a specific-function photographing lens (quick shift lens) is attached to the camera body 11, and a peaking display is indicated during the AF process when in an AF locked-on state; however, the present invention is not limited to such a configuration. For example, a configuration is possible in which even if a photographing lens other than the above-mentioned specific-function photographing lens (quick shift lens) is attached to the camera body 11, a peaking display can be indicated during the AF process when in an AF locked-on state.

In the illustrated embodiment of the present invention, a peaking display is carried out during an AF locked-on state, however, the present invention is not limited thereto; a configuration is possible in which upon attaining an AF locked-on state, a magnified peaking display is indicated on an in-focus object image of an object image that has been magnified (enlarged) when a magnification display function is performed on an object-image section that includes an in-focus object image area.

In the illustrated embodiment, the present invention has been applied to the camera body 11 which is not provided with a mirror or a shutter, however, the present invention is not limited thereto. For example, the present invention can be applied to a digital SLR camera that is provided with a mirror and a shutter in the case where the digital SLR camera can display a live-view with the mirror in a mirror-up position and with the shutter open. Furthermore, the present invention can also be applied to a digital camera that is provided with an EVF (electronic view finder) that constitutes as a display for indicating an object image captured by an image sensor.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A digital camera comprising:
an image sensor which captures an object image via a photographing lens;
a display device which displays an object image captured by said image sensor;
an autofocus adjuster which detects a focal state based on said object image captured by said image sensor and brings a specified object image into an in-focus state, based on the detected focal state, by moving a focal-adjusting lens group of said photographing lens in the optical axis direction thereof;
a focus lock-on device which prohibits said focal-adjusting lens group from moving in the optical axis direction, via the autofocus adjuster, and enters a focus locked-on state when the autofocus adjuster brings said specified object image into an in-focus state;
a focus lock-on detector which detects whether or not said focus lock-on device is in a focus locked-on state; and
a distinguishing-display controller which carries out image processing on at least a part of said specified object image, whereby a peaking display of the specified object image is displayed on said display device in a distinguished manner from the other object images,
wherein said image processing and said peaking display of the specified object image are carried out by said distinguishing-display controller when said focus lock-on detector detects a focus locked-on state of said focus lock-on device.

2. The digital camera according to claim 1, wherein said digital camera further comprises a lens detector which detects whether or not said photographing lens is a specific-function photographing lens that is provided with a manual operational member which moves said focal-adjusting lens group via a manual operation independent from said autofocus adjuster,
wherein, in the case where said focus lock-on detector detects that said focus lock-on device is in a focus locked-on state and the lens detector detects that said photographing lens is said specific-function photographing lens, said distinguishing-display controller carries out image processing on said at least a part of said specified object image, whereby said specified object image is displayed on said display device in a distinguished manner from the other object images.

3. The digital camera according to claim 1, further comprising a magnified-display controller which displays, in said display device, a magnified view of a section including at least said specified object image of said object image captured by said image sensor,
wherein, when a magnified view is displayed by said magnified-display controller, said magnified-display controller carries out image processing on at least a part of said specified object image, whereby a magnified peaking display of the specified object image is displayed on said display device in a distinguished manner from the other object images.

4. The digital camera according to claim 1, wherein said distinguishing-display controller displays, in said display device, a perimeter of said specified object image with a different thickness, color or brightness to a perimeter of said other object images.

* * * * *